Sept. 19, 1961     O. N. DAVIS     3,000,086
CAM LOCKED SHEET METAL CLAMP WITH INDEPENDENTLY
OPERABLE EXPANDER PIN
Filed May 29, 1957

INVENTOR.
OSCAR N. DAVIS
BY Hubert Mill
ATTORNEY

United States Patent Office 3,000,086
Patented Sept. 19, 1961

3,000,086
CAM LOCKED SHEET METAL CLAMP WITH INDEPENDENTLY OPERABLE EXPANDER PIN
Oscar N. Davis, 1528 E. 55th St., S., Wichita, Kans.
Filed May 29, 1957, Ser. No. 662,451
8 Claims. (Cl. 29—238)

This invention relates generally to an expandible mandrel type clamp for temporarily clamping one or a plurality of plates or sheets of material flat against each other or against a template or jig to maintain their relative positions while work is being performed on them.

A primary object of the invention is to provide a clamp of this type which is capable of being quickly adjusted to clamp sheet metal or plates of varying total thickness.

A further object is to provide a clamp which can be quickly installed and as quickly removed, without the use of a tool of any kind.

A still further object is to provide a clamp of the type mentioned which exerts a strong compressive force against the workpieces clamped, by means of an internal spring, and which simultaneously positively prevents relative sliding movement of each sheet of plate clamped with relation to the other sheets or plates.

The invention, together with other objects, will be more clearly understood when the following description is read in connection with the accompanying drawings, in which.

*General description*

Figure 1:
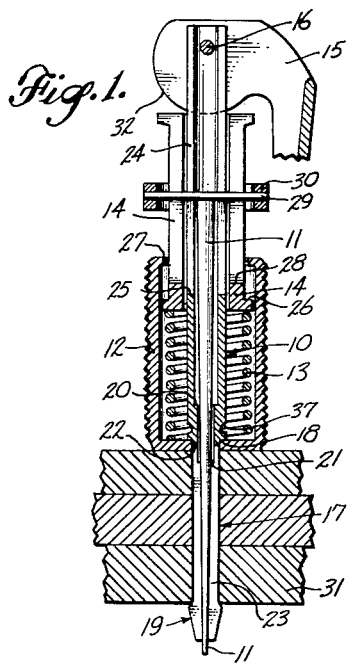
FIG. 1 is a vertical central sectional view of a simplified form of clamp embodying my invention shown clamping three work sheets together face to face.

Referring now to the simplified form of the invention illustrated in FIG. 1, the clamp shown briefly includes an elongated expanding mandrel 10 having a longitudinal bore throughout its length; a tapered mandrel expanding pin 11 movable longitudinally in the mandrel bore; a generally cup-shaped pressure shoe 12 having a central hole in its otherwise closed lower end through which the segmented expandible end of the mandrel projects; a compression spring 13 housed in the shoe 12 surrounding the mandrel 10; a spring compressing sleeve 14 having an enlarged external annular shoulder on its inner end which is held captive in the crimped open end of the shoe 12; the sleeve 14 surrounding the mandrel and being freely movable longitudinally with relation thereto and with relation to shoe 12 in order to compress the spring 13; and a sleeve actuating cam lever 15 which is pivotally connected at 16 to the upper end of the mandrel 10, and which cams on the outer end surface of sleeve 14 to force the sleeve to move into shoe 12 and compress spring 13.

*Details of construction (FIG. 1)*

Still referring to FIG. 1, mandrel 10 is fabricated from a steel rod of constant diameter. It is first machined exteriorly to provide a reduced diameter portion 17, or constant diameter, which extends between shoulder 18 and an annular enlarged tip 19, which is of frusto-conical cross-section, and which is also machined to shape.

Next the rod is bored longitudinally from its other end to the point 20, and from that point is counterbored to the internal shoulder 21. The remainder of the bore is taper bored at a very slight constant taper from the shoulder 21 to the extreme end of tip 19.

Figure 8:
FIG. 8 is a bottom plan view of the end of the expanding mandrel and the expanding pin, taken as indicated by the line 7—7 of FIG. 3.

The reduced diameter portion of the rod is then longitudinally slotted from the extreme end of tip 19 inward to the point 22, intermediate the ends 20—21 of the counterbore. A preferred slotting arrangement is shown in FIG. 8. At any rate, the radially disposed slots provide the mandrel with a plurality of elongated fingers 23 which are integral with the main body of the mandrel, which are generally segment shaped in cross section, and which are inherently resilient due to the characteristics of the metal of which the mandrel is made. Sufficient slots should be made in the rod to provide a minimum of three such fingers.

Figure 5:
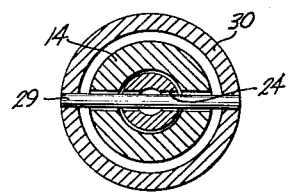
FIG. 5 is a transverse sectional view taken along the line 5—5 of FIG. 3.
Figure 7:
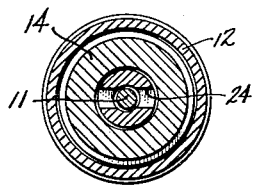
FIG. 7 is a transverse sectional view taken along the line 7—7 of FIG. 3.

The opposite end of the rod from which the mandrel is being fabricated is next slotted longitudinally inward with one diametral cross slot 24 (FIG. 5) which terminates at 25 (FIG. 1).

Sleeve 14, which fits telescopically within the open end of shoe 12 has an enlarged external annular shoulder 26 on its enclosed end, and the open end of shoe 12 is crimped at 27 to serve as a stop for the outward movement of the sleeve. From its outer end sleeve 14 is diametrally slotted inward to point 28. The slot in sleeve 14 and the slot 24 in the adjacent end of the mandrel are of substantially the same width, and when aligned transversely they form a longitudinally extending slideway for a cross pin 29.

The mandrel expanding pin 11 has a constant external tape substantially throughout its length, and the degree of taper is identical to the degree of taper of the bore through the fingered portion of mandrel 10. The point of largest diameter of pin 11 is smaller than the diameter of the counterbore 20—21 in mandrel 10.

Cross pin 29 is welded to the large diameter end of pin 11 and the opposite ends of cross pin 29 are press fitted or otherwise rigidly secured to a ring 30, which preferably has a larger internal diameter than the exterior diameter of sleeve 14, primarily to aid in assembly. Ring 30 serves as a means for manually moving the tapered expander pin 11 in either direction in the bore of the mandrel.

Figure 4:
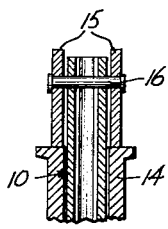
FIG. 4 is a fragmentary transverse sectional view of the upper end of the clamp taken normal to the cutting plane of FIG. 3.

The cam lever 15 has a generally circular sleeve contacting head which is pivotally connected to the upper end of mandrel 10 by an accentrically located pivot pin 16. The lever is generally U-shaped in cross section, as clearly shown in FIG. 4.

It should be understood that the embodiment of the clamp illustrated in FIG. 1 and described above is incapable of adjustment to clamp assembled work sheets which vary materially in total thickness. In FIG. 1, the clamp is shown clamping three work sheets together. If one of the sheets was removed, this particular clamp would be incapable of clamping the two remaining sheets together, because of the resulting reduction in total thickness of the sheets to be clamped. The modified embodiment, shown in FIGS. 2 and 3, however, is capable of adjustment to accommodate wide variations in total work sheet thickness.

Operation

As shown in FIG. 1, the three work sheets are under a compressive force exerted by spring 13 and applied by the tip 19 in one direction, and by the shoe 12 in the opposite direction. The mandrel 10 and shoe 12 can thus be considered as the clamping members.

To release and remove the clamp, lever 15 is rotated 180° counterclockwise about its pivot axis 16. This allows sleeve 14 to move to the upper end of its permitted travel under the influence of spring 13. Ring 30 and the attached expander pin 11 are next moved toward lever 15, which results in the lower end of pin 11 moving out of contact with the taper bored justaposed flexible fingers 23. As a result each finger is free to move radially inward a slight distance, thereby reducing the overall outside diameter of the tip 19 so that the fingered portion of the mandrel may be withdrawn from the perforations 35 in the work sheets, as clearly shown in FIG. 6.

To clamp a group of work sheets together they must first be provided with through perforations, which must be aligned. The perforation in that sheet 31 which is remote from the shoe 12 must be slightly smaller than the diameter of the largest portion of tip 19 when the tip is expanded by the pin 11.

Figure 6:
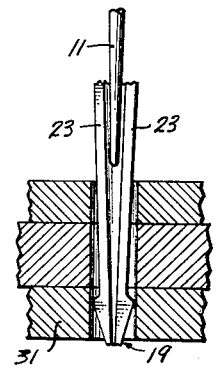
FIG. 6 is a fragmentary sectional view of the mandrel and expanding pin during insertion or withdrawal from aligned perforations in the work sheets.
Figure 2:
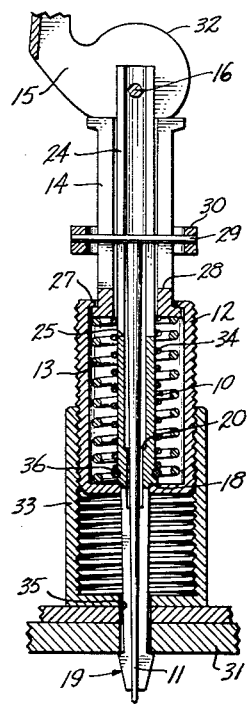
FIG. 2 is a vertical central sectional view of a modified clamp embodying the invention shown with its mandrel projecting through two work sheets, and ready to be actuated to clamp them together.

With the work sheet perforations aligned, pin 11 is first manually withdrawn from the fingered end of mandrel 10. This end of the mandrel is then inserted through the aligned perforations in the several worksheets, or in a worksheet and jig, as shown in FIG. 6, until the enlarged shoulder of the tip 19 clears the outer surface of the remote worksheet, as illustrated in FIG. 2. Next the expander pin 11 is manually moved toward tip 19 until the individual fingers 23 are moved radially outward by the wedging or camming action of the pin 11, and the tip diameter enlarges to a greater diameter than the perforation in the worksheet 31. It should be noted that the radial outward movement of the fingers occurs throughout their length due to their flexibility, due to the longitudinal depth of the slots which separate the fingers, and to the fact that the expanding pressure is applied by pin 11 along the entire tapered inner surfaces of the fingers, from shoulder 21 to their extreme outer or tip ends. They actually flex between shoulder 21 and the inner ends 22 of the slots which separate them.

Next the lever 15 is rotated clockwise about its axis 16, to the position shown in FIG. 1. The first movement of parts which occurs during this lever movement is that mandrel 10 is backed outward slightly from the position shown in FIG. 2 to the position shown in FIG. 3, with its enlarged shoulder in firm contact with the outer surface of that portion of work sheet 31 which immediately surrounds the perforation therein.

Continued lever movement causes cam surface 32 to move sleeve 14 into shoe 12, tightly compressing spring 13. Spring compression force is transmitted directly to shoe 12 in one direction and to mandrel 10 in the opposite direction, thus tightly clamping the several work sheets together between the shoe and the mandrel tip 19.

FIG. 2 embodiment

Figure 3:
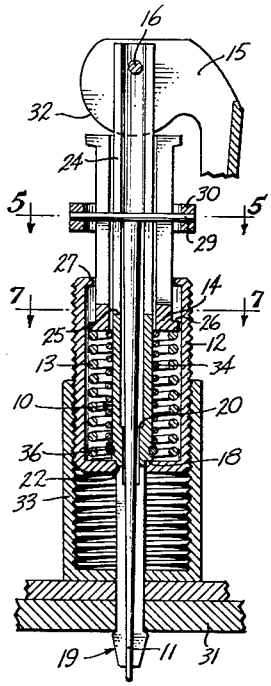
FIG. 3 is a similar view showing the relative positions of parts after the work sheets have been clamped together.

That embodiment of the invention illustrated in FIGS. 2 and 3 includes the same parts as the described FIG. 1 embodiment, plus an adjustable auxiliary pressure shoe 33, and a mandrel withdrawing inner coil spring 34.

Shoe 33 has the same general cup-like configuration as shoe 12, is interiorly threaded to fit the exterior threads of shoe 12, and has a like perforation in its otherwise closed worksheet contacting end. Lengthwise adjustment of shoe 33 on shoe 12 allows the clamp to clamp assembled work sheets of varying total thickness, as clearly shown in FIGS. 2 and 3. In the claims the term shoe refers both to the shoe 12 alone, and to the assembled shoes 12 and 33, where the wording permits.

Spring 34 closely surrounds the intermediate portion of mandrel 10 inside shoe 12, and inside spring 13. One end of spring 34 bears against sleeve 14, and its other end bears against a split ring 36 carried in an annular groove 37 (FIG. 1) in mandrel 10. Spring 34 is compressed when lever 15 and sleeve 14 are in the relative positions shown in FIG. 2, and serves to normally hold lever 15 in its FIG. 2 position, and to maintain mandrel shoulder 18 seated on the inner surface of shoe 12 when the clamp is not engaged in its clamping duty.

The operation of the FIG. 2 embodiment is identical to the operation of the FIG. 1 embodiment. When lever 15 is moved to its FIG. 3 position, the compressive force of spring 13 is transmitted through sleeve 14 to lever 15, through pin 16 to the upper end of mandrel 10. Spring force in the opposite direction is transmitted from shoe 12 to shoe 33 directly to the contacted work sheet.

From the above description it will be seen that the invention provides a self-contained clamp for quickly clamping two or more work pieces together to hold them firmly in predetermined relative positions, which is adjustable to assembled work pieces which vary in overall thickness, and which can be easily and quickly removed and the work pieces released, all without the use of any auxiliary tool.

Having described the invention with sufficient clarity to enable those familiar with this art to construct and use it, I claim:

1. A tool for forcing two or more superimposed work sheets into desired relative positions by first forcing like sized circular perforations in the respective sheets into exact registry, and for subsequently clamping the sheets flat against each other to maintain them in the desired relative positions, said tool comprising: a generally cup shaped pressure shoe having a central hole in its otherwise closed bottom end; a sleeve mounted within the open end of said shoe and projecting therefrom and having limited reciprocal movement with relation thereto; a compressed coil spring within the shoe bearing against the bottom of the shoe and against the inner end of the sleeve and urging the sleeve toward the outer end of its limited path of travel; an elongated centrally bored mandrel extending centrally through the sleeve and through the hole in the bottom of the shoe and projecting beyond the respective remote ends of both, and having limited reciprocal movement with relation thereto, that portion of the mandrel which projects from the shoe being longitudinally segmented to provide a plurality of elongated flexible work engaging fingers with enlarged work engaging portions at their tips; a cam pivotally mounted on that portion of the mandrel which projects from the sleeve and bearing against the outer end of the sleeve, said cam being manually movable to force the sleeve to move along the mandrel toward the fingered end thereof to further compress said spring to increase the compressive force on work pieces positioned between the shoe and said tips; and an expander pin freely movable in the bore of said mandrel and being movable longitudinally therein, said pin being completely independent of the sleeve, shoe and mandrel for penetration of the segmentally fingered portion of the mandrel to exert an outward wedging action on all said fingers to increase the peripheral diameter of said fingered portion.

2. The tool described in claim 1 in which the bore through the fingered portion of the mandrel has a constantly reducing taper outward through the finger tips, and the expander pin has an identical constantly reducing taper toward that end which penetrates the fingered portion of the mandrel.

3. The clamp described in claim 1 in which the exterior side wall surface of the pressure shoe is threaded, and a generally cup-shaped extension shoe complementally engaging the pressure shoe and adjustable lengthwise thereon, the extension shoe having a central perforation in its otherwise closed end through which the fingered portion of the mandrel projects and is reciprocable.

4. A clamp capable of exerting a compressive force against the respective outermost surfaces of two or more perforated work pieces arranged face to face, comprising: a generally cup-like pressure shoe constituting one clamping member and having a central perforation in its other-wise closed workpiece contacting end; a generally tubular sleeve having one end held captive in the open end of the shoe and capable of limited telescopic movement therein; a compression spring within the shoe having one end bearing against the shoe and the other end against the captive end of the sleeve and normally maintaining the sleeve at the outer end of its limited path of travel; an elongated centrally bored coaxially disposed mandrel extending through the sleeve and the shoe and projecting from the respective remote ends thereof, that portion of the mandrel which projects from the shoe constituting a second clamping member, the bore therein being of constantly reducing taper outward from the shoe, said portion having an enlarged diameter tip on its extreme end and being divided longitudinally into a plurality of elongated integral inherently flexible workpiece contacting fingers capable of generally radial movement to increase and decrease the outside diameter of the fingered portion of the mandrel; a tapered expanding pin freely movable longitudinally in the bore of said mandrel independent of any movement of said sleeve, said pin being completely independent of the sleeve, shoe and mandrel, said pin having a constantly reducing tapered exterior complemental to the bore in the fingered portion of the mandrel, and capable of being moved manually into said fingered portion to expand the diameter thereof; and a cam pivotally connected to that portion of the mandrel which projects from the outer end of said sleeve and in camming contact with the outer end of said sleeve, and manually operable to force said sleeve into the shoe to compress said spring and to urge the shoe toward the tips of said fingers.

5. A clamp such as described in claim 4 in which the mandrel has an enlarged diameter shoulder intermediate its ends to limit the outward movement of its fingered portion with relation to the shoe.

6. The clamp described in claim 4, and an inner compression coil spring surrounding the mandrel within the shoe and having one end bearing against the captive end of the sleeve; and means carried by the mandrel against which the other end of the inner coil spring bears.

7. The clamp described in claim 4 and a ring secured to the larger diameter end of said expanding pin, said ring being slidably mounted on the sleeve, and means on the ring extending through the sleeve and mandrel and engaging the upper end of the pin, said ring serving as a means for manually moving said pin with relation to the mandrel and sleeve.

8. A tool for insertion into pre-drilled holes in several superimposed workpieces for initially accurately aligning said holes and for subsequently clamping the superimposed workpieces against each other to maintain hole alignment and retain the workpieces in rigid clamped relationship comprising an elongated hollow pressure shoe, an elongated hollow mandrel extending through the shoe and projecting longitudinally beyond both ends thereof, one projecting end of said mandrel being longitudinally slotted to provide a plurality of longitudinal fingers for radial expansion and contraction thereof, a coil spring disposed longitudinally in enclosing relation to the mandrel, said coil spring being disposed within said shoe and having one end thereof engaged with one end of the shoe, a sleeve mounted on the mandrel for longitudinal sliding movement thereon with one end of the sleeve being received within the shoe and engaging the opposite end of the spring, the other end of the sleeve being disposed adjacent the other end of the mandrel, cam means pivotally connected to the other end of said mandrel and engaging the other end of said sleeve for moving the sleeve longitudinally in relation to the mandrel, an elongated smoothly tapered expander pin disposed within said mandrel, said pin being completely independent of the mandrel and manually movable in relation to the mandrel for expanding the fingers, said fingers and the adjacent portion of the mandrel being smoothy tapered complementary to the taper on the pin whereby the pin will expand the fingers when the pin is moved towards the end of the mandrel having the fingers formed thereon, said pin terminating below the cam means and movable longitudinally freely in relation to the mandrel, sleeve, spring and shoe, and annular ring freely slidably mounted in encircling relation to the sleeve, a diametrical pin carried by said ring, said sleeve and said mandrel having diametrically opposed longitudinal slots receiving the diametrical pin for permitting longitudinal movement thereof in relation to the sleeve and mandrel, said pin overlying and engaging the inner end of the pin whereby the pin may be moved longitudinally by longitudinal movement of the ring on the sleeve.

References Cited in the file of this patent

UNITED STATES PATENTS

| | | |
|---|---|---|
| 1,552,147 | Hall | Sept. 1, 1925 |
| 2,234,938 | Degener | Mar. 11, 1941 |
| 2,276,344 | Rogers | Mar. 17, 1942 |
| 2,350,630 | Melcher | June 6, 1944 |
| 2,393,587 | Bugg et al. | Jan. 29, 1946 |
| 2,424,309 | Elvy | July 22, 1947 |

FOREIGN PATENTS

| | | |
|---|---|---|
| 353,093 | Italy | Oct. 5, 1937 |
| 502,374 | Great Britain | Mar. 16, 1939 |
| 964,157 | France | Jan. 25, 1950 |